United States Patent Office 3,851,010
Patented Nov. 26, 1974

3,851,010
PROCESS FOR THE SEPARATION OF ISOPRENE
Carlo Rescalli, Alessandro Ginnasi, and Pierluigi Rebora, San Donato Milanese, Italy, assignors to Snam Progetti S.p.A., San Donato Milanese, Italy
Filed Jan. 26, 1973, Ser. No. 327,238
Claims priority, application Italy, Jan. 28, 1972, 19,885/72
Int. Cl. C07c 7/08
U.S. Cl. 260—681.5  5 Claims

ABSTRACT OF THE DISCLOSURE

Isoprene of high, polymerization grade purity is separated from the mixture, consisting principally of $C_5$ hydrocarbons, contained in the stream produced by steam-cracking, through a multi-step process involving the use of a single solvent, wherein:

Figure 1:
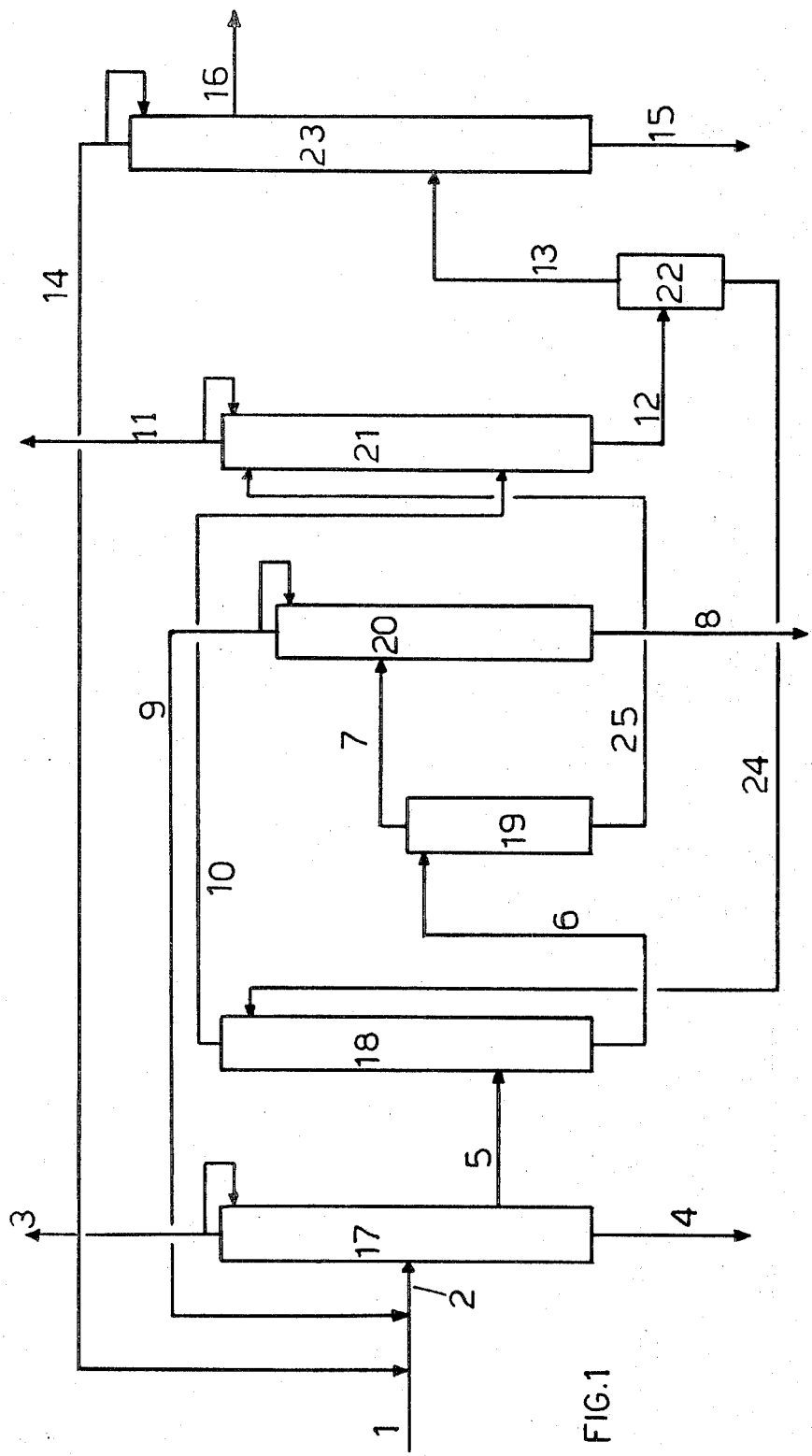

1. the feed stock is subjected to a rectification step in which a stream containing isoprene is separated out;
2. the isoprene containing stream from step 1 is subjected to an extractive distillation step, wherein an extraction solvent and reflux are employed which are provided by subjecting to flash evaporation the bottom stream from a subsequent extractive distillation step, to separate a stream containing isoprene, olefines, cyclopentadiene and $C_5$ saturated hydrocarbons from high boiling acetylenic compounds, pentadienes and all monocyclopentadiene contained in the feed, and the solvent is forwarded to a second distillation step;
3. the isoprene containing stream from step 2 is subjected to an extractive distillation step in which the solvent forwarded from step 2 is utilized to remove olefinic hydrocarbons, normal pentane and isopentane therefrom; and
4. the isoprene containing stream from step 3 is subjected to a rectification step separating therefrom any remaining heavy compounds, such as cyclopentene, cyclopentane and pentadienes, and any traces of low boiling compounds, to produce a polymerization grade of isoprene, in liquid phase. A conventional solvent, such as N-formylmorpholine, morpholine, or mixtures thereof, which may be supplemented with water, is used.

The present invention relates to a process for the separation of isoprene from mixtures containing it.

More particularly the present invention relates to the extraction of high purity isoprene from mixtures containing it. In fact it is well known that isoprene must be obtained at a high purity grade if it is used for producing stereospecific polymers because the impurities are extremely obnoxious during the polymerization.

In particular the content of monocyclopentadiene (MCP) must be lower than few ppm (preferably lower than 1 ppm) and on the other hand this compound is always present in the stream of hydrocarbons with 5 carbon atoms ($C_5$) coming from steam-cracking, which stream is a very interesting source for the recovery of isoprene (according to the operative conditions of pyrolysis, cyclopentadiene can be present in the $C_5$ fraction in percentages ranging from 10% to 30%). Many processes for the extraction of isoprene from said stream are known.

The most advantageous process for the recovery and purification of isoprene is the use of the extractive distillation.

In fact if the starting mixture containing isoprene and cyclopentadiene is subjected to extractive distillation in the presence of a suitable solvent, isoprene is obtained with quite negligible losses as distillate free from cyclopentadiene, while this latter is extracted by the solvent, since the cyclopentadiene volatility is strongly lowered.

The utilization of the extractive distillation moreover remarkably simplifies the separation of other compounds present in the feedstock, which although not so harmful to the isoprene polymerization as monocyclopentadiene would cause on the other hand isoprene losses and excessive operating costs for reducing their concentrations down to admissible values.

These compounds are essentially the $C_5$ olefinic hydrocarbons and in particular 2-methyl-2-butene (2M2B). In fact the volatility of these compounds in the presence of a suitable solvent, is so remarkably increased that, with negligible losses, there may be the elimination of the same compounds from the top as distillate and the discharge of isoprene together with the solvent from the bottom.

It is obvious that such extractive distillation operations must be carried out in two different phases, because in one of them isoprene is withdrawn from the top (free from MCP) and in the latter it is withdrawn from the bottom (free from olefines).

In the technique usually employed, the extractive distillation column for the olefines-isoperne separation precedes the one for the isoprene-MCP separation, but also solutions are known wherein the order of the columns is reversed. In both process schemes each extractive column is followed by a stripping column for the recovery of the solvent. The problems to be solved are essentially the following:

the reduction to a minimum of the solvent quantity necessary to the process operation; it is a known fact that the operation of the extractive distillation is more onerous and consequently the process is more expensive with increases in the quantity of solvent necessary for the operation.

the dimerization of monocyclopentadiene to dicyclopentadiene (DCP) in the extractive distillation columns.

In fact the separation of the solvent from the so-formed dicyclopentadiene is particularly onerous however it is effected; on the other hand it has been already widely proved that it is necessary to maintain the concentration of DCP in the solvent below extremely low levels (of the order of magnitude of few hundreds of p.p.m. by weight) to avoid the pollution of isoprene with monocyclopentadiene generated by transformation of DCP to MCP in the higher portion of the extractive distillation column which separates isoprene from monocyclopentadiene.

The process which is the subject of the present invention offers particularly advantageous solutions of such problems.

The process of the present invention consists in treating a feed mixture constituted by $C_5$ hydrocarbons coming from steam-cracking for recovering isoprene therefrom in the following way:

after distillation to eliminate the dimerization and/or polymerization products present in the feed, the $C_4$ hydrocarbons, the low boiling acetylenic compounds and most of isopentane, the gaseous mixture containing isoprene is treated in a first extractive distillation column to separate monocyclopentadiene, the high boiling acetylenic compounds and most of the 1,3 pentadiene in the feed and then in a second extractive distillation column separating the saturated and olefinic compounds with 5 carbon atoms, by utilizing both in the first distillation and in the second distillation a single stream of solvent and more exactly:
 (a) for the first column the solvent stream containing isoprene in such a quantity as to secure the reflux to the same, which is obtained by recovery from the bottom stream of the second extractive distillation;

(b) for the second column the solvent stream free from hydrocarbons and in particular from isoprene and monocyclopentadiene, which is obtained by recovery from the bottom stream of the first extractive distillation column.

The mixture containing isoprene and other minor impurities is then treated in a known way in a distillation column for removing said impurities.

The process which is the subject of the present invention will now be described in greater detail with reference to the enclosed figures 1 and 2, which are to be understood as illustrating but not restricting the invention itself.

We refer first to FIG. 1. The hydrocarbons feed (line 1) wherefrom the polymerization grade isoprene is to be recovered is introduced through line 2 together with the recycle streams 9 and 14 into a rectification column 17; all the $C_4$ hydrocarbons, the low boiling acetylenic hydrocarbons and from 70% to 90% of fed isopentane are withdrawn from the top (line 3), while from 30% to 60% of the high boiling hydrocarbons present in the feed and all dimerization and/or polymerization products formed in the tanks are withdrawn from the bottom (line 4).

From the side of the exhaust section of the column the stream containing isoprene is withdrawn in vapor phase and through line 5 is sent to the extractive distillation column 18, for separating monocyclopentadiene (MCP). The solvent necessary for operating the column arrives in the same through line 24.

From the bottom of column 18 are discharged (line 6) the solvent with all MCP, the acetylenic compounds and from 40% to 70% of the pentadienes present in the feedstock; a stream of raw isoprene containing moreover essentially $C_5$ olefines, cyclopentene, normalpentane and isoprene is discharged from the top (line 10).

The bottom stream of column 18 is sent to the stripping column 19 for the recovery of the solvent. This last is withdrawn from the bottom (line 25); the hydrocarbons are withdrawn from the top (line 7) and sent to the rectification column 20. These hydrocarbons contain also MCP.

Most of the high boiling hydrocarbons soluble in the solvent (heavy acetylenic compounds and 40% to 70% based on the feed of the dienic compounds, in particular 1,3 pentadiene) and all MCP sent to column 18 are eliminated from the bottom of column 20 (line 8), while from the top (line 9) the isoprene discharged from the bottom column 18 is recovered (this stream is sent again to column 17 for the removal of the soluble and low boiling hydrocarbons possibly present).

The raw isoprene in vapor phase and free from MCP withdrawn from the top of column 18, through line 10, is fed to the extractive distillation column 21, to which, through line 25 the extractive solvent recovered from column 19 is fed.

The olefinic hydrocarbons, normalpentane and isopentane are eliminated from the top of column 21 through line 11; a stream of solvent containing essentially isoprene and a portion of the cyclopentene sent to the cycle is discharged from the bottom (line 12). Said stream is subjected to a flash evaporation in 22 so as to obtain from the bottom (line 24) all the solvent and isoprene necessary respectively as extractive agent and as reflux to column 18; the vapors obtained by the same flash evaporation are sent through line 13 to the rectification column 23.

From the bottom of said last column (line 15) are withdrawn all the heavy hydrocarbons still contained in isoprene fed to column 23 (cyclopentene, cyclopentane and the remaining pentadienes), while from the top is withdrawn a stream of isoprene (line 14) containing the probable traces of low boiling compounds not previously elminated in columns 17 and 21 (this stream is recycled to column 17 for the recovery of the isoprene therein contained and the removal of the above mentioned impurities).

The polymerization grade isoprene is withdrawn in liquid phase from the side (line 16) of the enrichment section of column 23.

Figure 2:
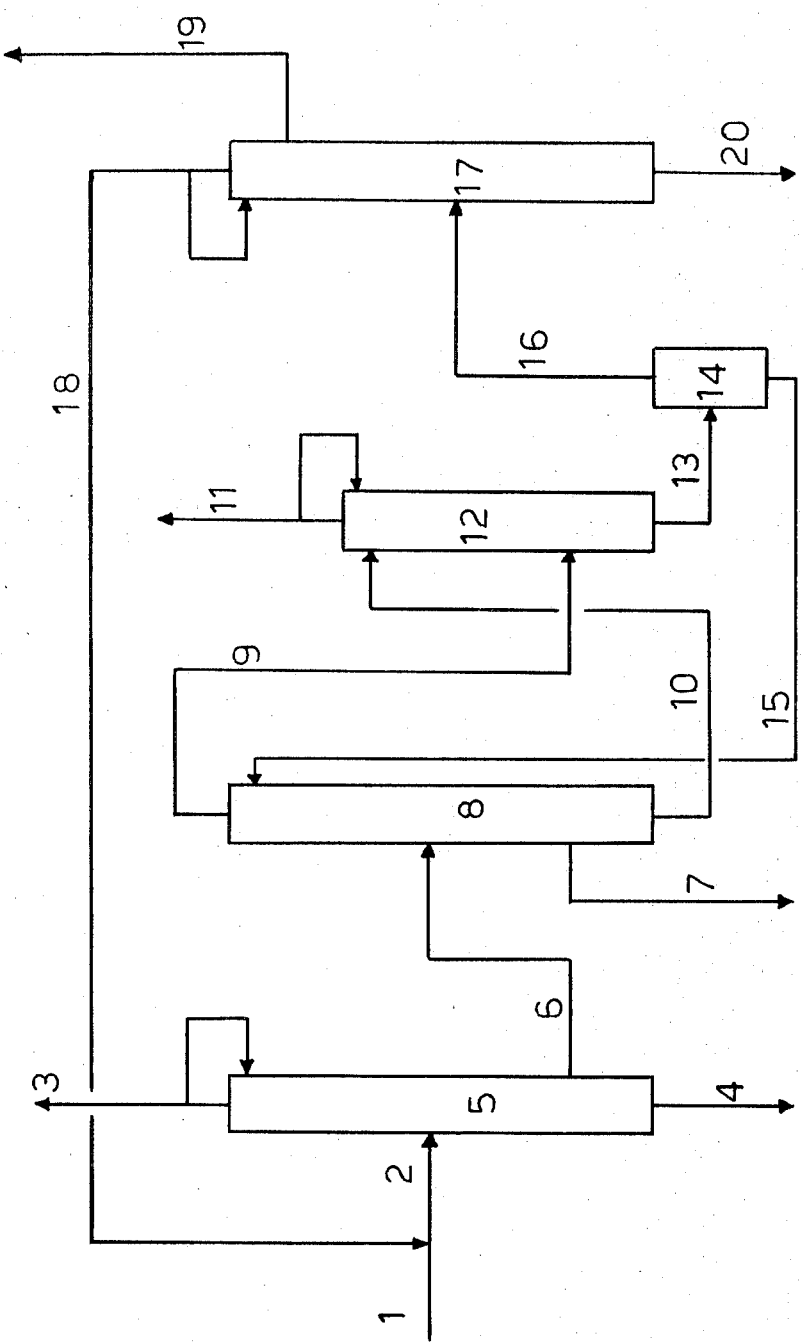

FIG. 2 represents a further modification of the process which is the subject of the invention.

In it the functions of columns 18 and 19 are performed by column 8. Moreover column 20 is eliminated because column 8 works under such conditions that the purge of stream 7 is allowed.

In said figure the hydrocarbons feedstock from which polymerization grade isoprene is to be recovered (line 1) is fed, together with recycle stream 18, through line 2, to a rectification column 5; from the top (line 3) are withdrawn the $C_4$ hydrocarbons, the low boiling acetylenic hydrocarbons and 70% to 90% of the fed isopentane, while from the bottom (line 4) are discharged all the dimerization and/or polymerization products formed during storage, and 30% to 60% of the high boiling hydrocarbons possibly present.

From the side of the exhaust section of the column there is withdrawn in vapor phase the isoprene-containing stream which, through line 6 is fed to extractive distillation column 8 for separating monocyclopentadiene. The solvent necessary for operating the column arrives at the same through line 15.

From the vapor phase of a plate of the exhaust section of column 8 is withdrawn (line 7) all MCP together with 30-60% of hydrocarbons soluble in the solvent (acetylenic compounds and dienes, present in stream 6); from the top is withdrawn (line 9) a stream of raw isoprene containing essentially $C_5$ olefines, cyclopentene, normalpentane and the remaining part of isopentane. From the bottom of column 8 the solvent is recovered.

The aforesaid raw isoprene stream is sent to the extractive distillation column 12, to which, through line 10 the extractive solvent recovered from column 8 is fed. From the top of column 12, through line 11, are elminated the olefinic hydrocarbons, normalpentane and isopentane; from the bottom a solvent stream (line 13) is discharged containing essentially isoprene and a portion of the cyclopentene sent to the cycle.

This stream is subjected to a flash evaporation in column 14 so as to obtain from the bottom (line 15) all the solvent and isoprene necessary respectively as extractive agent and as reflux to column 8; the vapors obtained from the same flash evaporation are sent to rectification column 17 through line 16.

From the bottom of this last column (line 20) are eliminated all the heavy hydrocarbons still contained in isoprene fed to column 17, while from the top a stream of isoprene is purged containing the probable traces of low boiling compounds not previously eliminated (this stream is recycled to column 5 to permit the recovery of isoprene therein contained and the removal of the above mentioned impurities).

From the side of the enrichment section of the same column 17, through line 19, polymerization grade isoprene in liquid phase is withdrawn. In the process which is the subject of the present invention it is possible to note that the solvent stream necessary for separating the olefines from isoprene is utilized also for separating MCP from isoprene, use being made of only one stripping column for the recovery of the solvent.

In this way, both a considerable lowering of the process operation costs and the reduction of the danger of dienes polymerization and particularly of MCP dimerization are obtained.

In the process which is the subject of the present invention the solvent is recycled to the first extractive distillation together with the hydrocarbons for the reflux.

From this it appears that the separation of the solvent from the hydrocarbons by means of stripping is not necessary.

In the processes of the prior art use is made of two separated cycles of solvent for the two extractive distillation columns and of a hydrocarbons reflux to the top of the first column of extractive distillation effected by reintroducing into the column a portion of the condensed overhead product.

The advantages present in our case are therefore: the elimination of a stripping operation and the elimination of the condensation of the overhead product of the first extractive distillation column for supplying the reflux to the same.

In this way a considerable quantity of heat and some stripping and condensation apparatuses are spared. The recycle to the first extractive distillation of the solvent and hydrocarbons obtained by flash evaporation (effected without supplying heat) of the bottom stream of the second extractive distillation; permits using, without further burdens, in the first extractive distillation a quantity of solvent remarkably higher than the one normally utilized for the separation of MCP from the remaining mixture. All this has as a consequence the further advantage of lowering the DCP content with benefits in the separation of MCP and acetylenic products from the bottom of the column.

The almost total lack of DCP in the solvent withdrawn from the bottom of the extractive distillation column which separates MCP from isoprene has various and considerable advantages.

Among the most important ones we note particularly the possibility of using, without particular expedients, anhydrous solvents and the substantial saving of steam necessary for recovering the solvent. Actually the almost complete absence of DCP in the solvent recycled to the extractive distillation column for the separation of the olefines assures the purity of isoprene, which is free from MCP contaminations, due, in other conditions, to the degradation of DCP.

The above-mentioned advantages derived from the use of the process of the present invention are limited neither by the type of feedstock nor by the type of used solvent.

For example N-formylmorpholine, morpholine, the same compounds mixed with each other and/or supplemented with water (1–20% by weight), permit obtaining polymerization grade isoprene with a content of monocyclopentadiene lower than 1 p.p.m. also starting from $C_5$ cuts containing cyclopentadiene in a 1/1 ratio with respect to isoprene. As already mentioned, the use of other solvents, already known in the technique and generally utilized in extractive processes, such as acetonitrile, furfural, aniline, dimethylformamide, dimethylacetamide, N-methylpyrrolidone, β-methoxypropionitrile, permits obtaining very good results, when these solvents or their mixtures, anhydrous or hydrated, are used in the process of the present invention. For illustrative and unrestrictive purposes some examples will now be given.

EXAMPLE 1

In these examples we will refer to FIG. 1. Through line 1 is sent to column 17 a feedstock consisting of:

| | Moles/h. |
|---|---|
| Isoprene | 268.0 |
| $C_4$ saturated and olefinic hydrocarbons | 59.3 |
| 3 methyl 1 butene | 13.7 |
| 1.4 pentadiene | 25.9 |
| 2 butyne | } 9.6 |
| Isopropylacetylene | |
| Isopentane | 114.8 |
| 1 pentene | 58.7 |

EXAMPLE 1—Continued

| | Moles/h. |
|---|---|
| 2 methyl 1 butene | 79.3 |
| Isopropenylacetylene | 1.1 |
| Normalpentane | 141.7 |
| Trans-2 pentene | 36.1 |
| Cis-2 pentene | 27.3 |
| 2 methyl 2 butene | 51.0 |
| 1.3-cyclopentadiene | 130.9 |
| Trans 1.3 pentadiene | 141.5 |
| Cis 1.3 pentadiene | 91.5 |
| Cyclopentene | 82.1 |
| Cyclopentane | 23.3 |
| 2.3 pentadiene | 6.3 |
| Dicyclopentadiene | 52.1 |

By working under the following conditions:

| | | |
|---|---|---|
| Overhead pressure | ata | 2.0 |
| Reflux ratio | ata | 10 |
| Plates | ata | 100 |
| Overhead temperature | °C | 45 |
| Bottom temperature | °C | 90 | from the top are removed (line 3) together with most of the isopentane, all the $C_4$ hydrocarbons and all the low boiling hydrocarbons present in the feedstock:

| | Moles/h. |
|---|---|
| Isoprene | 4.0 |
| $C_4$ saturated and olefinic hydrocarbons | 59.3 |
| 3 methyl 1 butene | 13.7 |
| 1.4 pentadiene | 24.5 |
| 2 butyne | } 9.6 |
| Isopropylacetylene | |
| Isopentane | 90.3 |
| 1 pentene | 17.8 |
| 2 methyl 1 butene | 10.9 |
| Isopropenylacetylene | 1.1 |

From the bottom are removed (line 4) all dicyclopentadiene and a portion of the high boiling hydrocarbons present in the feedstock:

| | Moles/h. |
|---|---|
| Isoprene | 4.0 |
| 2 methyl 2 butene | 3.9 |
| 1.3 cyclopentadiene | 38.5 |
| Trans 1.3 pentadiene | 51.3 |
| Cis 1.3 pentadiene | 47.2 |
| Cyclopentene | 47.1 |
| Cyclopentane | 21.8 |
| 2.3 pentadiene | 5.6 |
| Dicyclopentadiene | 52.1 |

Stream 5, withdrawn in vapor phase from the 20th plate placed above the reboiler and containing almost all isoprene fed to column 17, was sent to extractive column 18, which operated under the following conditions:

| | | |
|---|---|---|
| Overhead pressure | ata | 1.1 |
| Overhead temperature | °C | 40 |
| Bottom temperature | °C | 80 |
| Plates | | 50 |

The extractive solvent containing isoprene in such a quantity as to secure the desired reflux was sent to the top of column 18 through line 24.

The bottom stream containing in particular all monocyclopentadiene and the polar compounds was sent to stripper 19 in order to separate the hydrocarbons therein contained from the solvent.

The solvent was discharged from the bottom through line 25 and was utilized again in the cycle (as hereinbelow indicated). The hydrocarbons were sent to the rectification column to allow the recovery of isoprene present therein.

This last column worked under the following conditions:

| | |
|---|---|
| Overhead pressure | ata__ 1.2 |
| Reflux ratio | 5 |
| Overhead temperature | °C__ 40 |
| Bottom temperature | °C__ 50 |
| Plates | 50 |

The stream withdrawn from the top (line 9) was recycled to column 17, while from the bottom (line 8) all the polar high boiling hydrocarbons were discharged and in particular:

| | Moles/h. |
|---|---|
| Isoprene | 7.0 |
| 1.3 cyclopentadiene | 92.4 |
| Trans 1.3 pentadiene | 85.6 |
| Cis 1.3 pentadiene | 44.1 |
| Cyclopentene | 22.1 |
| 2.3 pentadiene | 0.6 |

The overhead stream of column 18 (line 10), containing almost all isoprene and free essentially from monocyclopentadiene, was sent to the extractive distillation column 21 to eliminate the C₅ saturated and olefinic products present in the feedstock; the solvent necessary for the operation was withdrawn from the bottom of the stripping 19 and was fed through line 25.

The column 21 worked under the following conditions:

| | |
|---|---|
| Overhead pressure | 1.2 ata. |
| Reflux ratio | 2.0. |
| Overhead temperature | 40° C. |
| Bottom temperature | 55° C. |
| Plates | 70. |
| Solvent | formylmorpholine-water (5% b.w. of water). |
| Solvent flow rate | 1200 kg./h. |

From the top (line 11) are discharged the C₅ saturated and olefinic hydrocarbons and in particular:

| | Moles/h. |
|---|---|
| Isoprene | 3.0 |
| 1.4 pentadiene | 1.3 |
| Isopentane | 24.5 |
| 1 pentene | 40.9 |
| 2 methyl 1 butene | 68.4 |
| Normalpentane | 141.7 |
| Cis 2 pentene | 36.1 |
| Trans 2 pentene | 27.1 |
| 2 methyl 2 butene | 44.5 |
| Cyclopentane | 0.6 |

The stream discharged from the bottom of column 21 (line 12) was permitted to expand to column 22 down to 1.1 ata. The liquid stream so separated (line 24) was recycled to column 18 and reutilized both as extractive solvent and as reflux.

The gaseous stream 13, after condensation, was sent to the rectification column 23 which worked under the following conditions:

| | |
|---|---|
| Overhead pressure | ata__ 1.0 |
| Reflux ratio | 80 |
| Overhead temperature | °C__ 60 |
| Bottom temperature | °C__ 65 |
| Plates | 100 |

From the top a stream (14) was withdrawn, which to column 17 was recycled, containing:

| | Moles/h. |
|---|---|
| Isoprene | 11.9 |
| 1.4 pentadiene | 0.1 |

From the bottom (line 15) the high boiling C₅ hydrocarbons still present were discharged, in particular:

| | Moles/h. |
|---|---|
| Isoprene | 4.0 |
| 2 methyl 2 butene | 2.6 |
| Trans 1.3 pentadiene | 4.6 |
| Cis 1.3 pentadiene | 0.2 |
| Cyclopentene | 12.9 |
| Cyclopentane | 0.9 |
| 2.3 pentadiene | 0.1 |

From the liquid phase of the 70th plate above the reboiler, through line 16, was withdrawn a stream of 246.0 moles/h. of polymerization grade isoprene containing essentially as impurities:

| | | |
|---|---|---|
| Cyclopentadiene | p.p.m by weight__ | <1 |
| 2 butyne | do____ | 10 |
| Total acetylenic acids (as isopropenylacetylene) | p.p.m. by weight__ | 2 |
| Total olefinic compounds (as 2 methyl 2 butene) | percent by weight__ | 0.18 |
| Total diene compounds (as 1.3 pentadiene) | do____ | 0.010 |

EXAMPLE 2

We will now refer to FIG. 2. A stream (1) like the one of example 1 was fed to column 5.

The working conditions were the following:

| | |
|---|---|
| Overhead pressure | ata__ 1.8 |
| Reflux ratio | 8 |
| Plates | 90 |
| Overhead temperature | °C__ 43 |
| Bottom temperature | °C__ 43 |

From the top were removed most of the low boiling hydrocarbons (line 3):

| | Moles/h. |
|---|---|
| Isoprene | 4.0 |
| C₄ saturated and olefinic hydroc. | 59.3 |
| 3 methyl 1 butene | 13.7 |
| 1.4 pentadiene | 25.1 |
| 2 butyne | } 9.6 |
| Isoprocylacetylene | |
| Isopentane | 94.9 |
| 1 pentene | 22.6 |
| 2 methyl 1 butene | 15.4 |
| Isopropylacetylene | 1.0 |

From the bottom were removed (line 4) all dicyclopentadiene with a portion of the other high boiling hydrocarbons present in the feedstock (1):

| | Moles/h. |
|---|---|
| Isoprene | 4.0 |
| 2 methyl 2 butene | 3.4 |
| 1.3 cyclopentadiene | 17.4 |
| Trans 1.3 pentadiene | 29.3 |
| Cis 1.3 pentadiene | 35.6 |
| Cyclopentene | 38.2 |
| Cyclopentane | 23.3 |
| 2.3 pentadiene | 6.3 |
| Dicyclopentadiene | 52.0 |

Stream 6 withdrawn in vapor phase from the 20th plate above the reboiler and containing almost all isoprene fed to column 5, was sent to the extractive distillation column 8, which worked under the following conditions:

| | |
|---|---|
| Overhead pressure | ata__ 155 |
| Overhead temperature | °C__ 40 |
| Bottom temperature | °C__ 155 |
| Plates | 70 |

There was withdrawn in vapor phase from the 15th plate a stream (7) constituted by:

| | Moles/h. |
|---|---|
| Isoprene | 7.0 |
| Isopropenylacetylene | 0.1 |
| 1.3 monocyclopentadiene | 113.5 |
| Trans 1.3 pentadiene | 79.7 |
| Cis 1.3 pentadiene | 53.8 |
| Cyclopentene | 3.2 |

Both the solvent discharged from the bottom (through line 10) and the raw isoprene stream discharged from the top of column 8 through line 9, were sent to the extractive distillation column 12 to eliminate the $C_5$ saturated and olefinic products present in the feedstock.

Column 12 operated under the following conditions:

| | |
|---|---|
| Overhead pressure | 1.2 ata. |
| Reflux ratio | 2.0. |
| Overhead temperature | 40° C. |
| Bottom temperature | 55° C. |
| Plates | 65. |
| Solvent | Formylmorpholine-water (5% b.w. of water). |
| Solvent flow rate | 1200 kg./h. |

From the top (line 11) were eliminated:

| | Moles/h. |
|---|---|
| Isoprene | 3.0 |
| 1.4 pentadiene | 0.6 |
| Isopentane | 19.9 |
| 1 pentene | 36.1 |
| 2 methyl butene | 63.8 |
| Normalpentane | 137.7 |
| Cis 2 pentene | 26.2 |
| Trans 2 pentene | 35.0 |
| 2 methyl 2 butene | 42.6 |

The stream discharged from the bottom of 12 (line 13) was permitted to expand in 14 down to 1.1 ata.

The liquid stream so obtained (line 15) was recycled to column 8 and re-used both as extractive solvent and as reflux.

The gaseous stream 16, after condensation, was sent to rectification column 17, which worked under the following conditions:

| | | |
|---|---|---|
| Overhead pressure | ata | 1.8 |
| Reflux ratio | | 80 |
| Overhead temperature | ° C | 60 |
| Bottom temperature | ° C | 65 |
| Plates | | 100 |

From the top a stream 18 was withdrawn which was recycled to column 5 and containing:

| | Moles/h. |
|---|---|
| Isoprene | 11.9 |
| 1.4 pentadiene | 0.2 |
| 2 methyl 1 butene | 0.1 |

The high boiling $C_5$ hydrocarbons still present were discharged through line 20, they being in particular:

| | Moles/h. |
|---|---|
| Isoprene | 4.0 |
| 2 methyl 2 butene | 4.6 |
| Trans 1.3 pentadiene | 32.5 |
| Cis 1.3 pentadiene | 2.1 |
| Cyclopentene | 40.7 |

From the liquid phase of the 70th plate above the reboiler was withdrawn a stream 19 of 246.0 moles/h. of polymerization grade isoprene containing essentially as impurities:

| | | |
|---|---|---|
| Cyclopentadiene | p.p.m. by weight | ≤1 |
| 2 butyne | do | 10 |
| Total olefinic compounds (as 2 methyl 2 butene) | percent by weight | 0.22 |
| Total diene compounds | do | 0.01 |
| Acetylenic compounds | p.p.m. | 5 |

We claim:

1. Process for recovering isoprene of polymerization grade from a mixture of $C_4$ and $C_5$ hydrocarbons including isoprene, comprised of the following steps:

(a) ratification wherein $C_4$ hydrocarbons, low boiling acetylenic compounds, 70% to 90% of isopentane are withdrawn as overhead, and dimerization and polymerization products 30% to 60% of the high boiling hydrocarbons present in the feed are withdrawn as bottom product, and the stream containing isoprene is withdrawn in vapor phase from a plate of the exhaust section of a rectifier;

(b) a first extractive distillation, utilizing reflux and solvent, selected from the group consisting of N-formylmorpholine, morpholine and mixtures of said compounds with each other and with water, obtained by subjecting to flash evaporation the bottom stream of a second extractive distillation step, wherein monocyclopentadiene, high boiling acetylenic compounds and 40% to 70% of pentadienes present in said stream are withdrawn as bottom product and a stream containing raw isoprene is withdrawn as overhead with olefines, cyclopentene, and $C_5$ saturated hydrocarbons;

(c) stripping the bottom stream of the first extractive distillation step by separating the solvent from monocyclopentadiene and other hydrocarbons, wherein the solvent is recovered as bottom product and monocyclopentadiene and other hydrocarbons soluble in the solvent are discharged as overhead;

(d) rectification of the overhead hydrocarbon stream from the stripping step (c) wherein monocyclopentadiene, the high boiling acetylenic compounds and 40% to 70% based on the feedstock of the diene compounds are withdrawn as bottom product and isoprene contained in the stream coming from stripping step (c) is discharged as overhead product and sent to the rectification column of step (a);

(e) second extractive distillation of the raw isoprene stream obtained from the first extractive distillation step (b) wherein said stream is fed in vapor phase and the $C_5$ saturated and olefinic compounds are withdrawn as overhead, the solvent necessary therefor being withdrawn from the bottom of the stripping column of step (c);

(f) flash evaporation of the streams discharged as bottom product in the extractive distillation step (e), the liquid phase being recycled to the top of the first extractive column for supplying said column both with the extractive solvent and the hydrocarbon stream necessary for the reflux, the vapor phase constituted by isoprene essentially impure for cyclopentene and cyclopentane being sent to a further rectification step;

(g) rectification eliminating as bottom product the still present heavy compounds, cyclopentene, cyclopentane and the remaining pentadienes, withdrawing as overhead a stream of isoprene containing traces of low boiling compounds, which stream is recycled to the rectification column of step (a) withdrawing in liquid phase from a plate of the upper section of the rectification column polymerization grade isoprene.

2. Process for recovering isoprene of polymerization grade from a mixture of $C_4$ and $C_5$ hydrocarbons including isoprene, comprised of the following steps:
  (a) rectification wherein the $C_4$ hydrocarbons, the low boiling acetylenic compounds, 70% to 90% of isopentane are withdrawn as overhead and dimerization and polymerization products and 30% to 60% of the high boiling hydrocarbons in the feed are withdrawn as bottom product present, and a stream containing isoprene is discharged in vapor phase from a plate of the exhaust section of a rectifier;
  (b) a first extractive distillation of the stream containing isoprene, utilizing reflux and solvent, selected from the group consisting of N-formylmorpholine, morpholine and mixtures of said compounds with each other and with water, obtained by subjecting to flash evaporation the bottom stream of a second extractive distillation step, wherein as overhead product, a stream of raw isoprene containing essentially $C_5$ olefines, cyclopentene, normal pentane and the remaining part of isopentane is obtained, the solvent is recovered as bottom product, all monocyclopentadiene together with 30%-60% of the hydrocarbons soluble in the solvent is eliminated in vapor phase from a plate of the exhaust section;
  (c) second extractive distillation of the isoprene containing stream obtained in step (b) wherein the olefinic hydrocarbons, normal pentane and isopentane are separated as overhead, and, a stream containing essentially isoprene and cyclopentene is recovered as bottom product;
  (d) flash evaporation of the bottom stream recovered in step (c) wherein all the solvent and isoprene necessary respectively as extractive agent and as reflux to the first extractive distillation are recovered as bottom product and a stream containing isoprene to be rectified is recovered as overhead;
  (e) rectification of the stream containing isoprene obtained in step (d), separating from the bottom all the heavy hydrocarbons still contained therein, recovering from the top a stream of isoprene containing traces of low boiling compounds, which stream is recycled to the rectification of step (a) and recovering in liquid phase from a plate of the enrichment section of a rectification column the polymerization grade isoprene.

3. Process for the separation of isoprene from mixtures containing it according to claim 1 wherein the separation of the acetylenic low boiling compounds carried out by rectification, is effected contemporaneously with the separation of the $C_4$ hydrocarbons and of most of isopentane present in the feedstock.

4. Process for the separation of isoprene from mixtures containing it according to claim 1 wherein the extractive distillation for separating monocyclopentadiene precedes the distillation for separating the olefinic hydrocarbons.

5. Process for separating isoprene from mixtures containing it according to claim 1, wherein the first extractive distillation is carried out in the presence of most of the high boiling hydrocarbons present in the feedstock sent to the cycle.

References Cited
UNITED STATES PATENTS

| | | | |
|---|---|---|---|
| 3,510,405 | 5/1970 | Takao et al. | 260—681.5 R |
| 3,674,883 | 7/1972 | Schleppinghoff | 260—681.5 R |
| 3,230,157 | 1/1966 | Hill et al. | 260—681.5 R |
| 2,971,036 | 2/1961 | James | 260—681.5 R |
| 3,012,947 | 12/1961 | Kelley et al. | 260—681.5 R |
| 3,775,259 | 11/1973 | Sarns | 260—681.5 R |
| 3,784,626 | 1/1974 | Ginnasi et al. | 260—681.5 R |
| 3,795,588 | 3/1974 | Preusset et al. | 260—681.5 R |

DELBERT E. GANTZ, Primary Examiner

V. O'KEEFE, Assistant Examiner